United States Patent
Cavaliere et al.

(10) Patent No.: US 10,938,500 B2
(45) Date of Patent: Mar. 2, 2021

(54) METHODS AND APPARATUS FOR DUAL POLARISATION OPTICAL COMMUNICATION

(71) Applicant: TELEFONAKTIEBOLAGET LM ERICSSON (PUBL), Stockholm (SE)

(72) Inventors: Fabio Cavaliere, Pisa (IT); Gianluca Meloni, Pisa (IT); Francesco Fresi, Pisa (IT); Vito Sorianello, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/465,177

(22) PCT Filed: Dec. 12, 2016

(86) PCT No.: PCT/EP2016/080599
§ 371 (c)(1),
(2) Date: May 30, 2019

(87) PCT Pub. No.: WO2018/108235
PCT Pub. Date: Jun. 21, 2018

(65) Prior Publication Data
US 2020/0007263 A1 Jan. 2, 2020

(51) Int. Cl.
*H04J 14/06* (2006.01)
*H04B 10/532* (2013.01)
*H04B 10/67* (2013.01)

(52) U.S. Cl.
CPC ............ *H04J 14/06* (2013.01); *H04B 10/532* (2013.01); *H04B 10/67* (2013.01)

(58) Field of Classification Search
CPC ........ H04J 14/06; H04B 10/67; H04B 10/532
See application file for complete search history.

(56) References Cited

U.S. PATENT DOCUMENTS

| | | | |
|---|---|---|---|
| 2008/0232816 A1* | 9/2008 | Hoshida | H04B 10/532 398/152 |
| 2012/0207475 A1* | 8/2012 | Tian | H04J 14/06 398/65 |

(Continued)

FOREIGN PATENT DOCUMENTS

| | | |
|---|---|---|
| EP | 2538594 A2 | 12/2012 |
| WO | 2017050393 A1 | 3/2017 |

OTHER PUBLICATIONS

Fred Heismann, "Analysis of a Reset-Free Polarization Controller for Fast Automatic Polarization Stabilization in Fiber-optic Transmission Systems", Journal of Lightwave Technology, Apr. 1994, pp. 690-699, vol. 12, No. 4.

(Continued)

*Primary Examiner* — Leslie C Pascal
(74) *Attorney, Agent, or Firm* — Patent Portfolio Builders PLLC

(57) ABSTRACT

A method for dual polarisation optical transmission is disclosed. The method comprises splitting a continuous wave light source into first and second sub-channels, optically modulating each sub-channel with a data signal, and superimposing a first pilot tone onto the first optically modulated sub-channel and a second pilot tone, different from the first pilot tone, onto the second optically modulated sub-channel. The method further comprises polarisation multiplexing the first and second sub-channels to form a polarisation multiplexed signal, in which the first and second sub-channels have orthogonal states of polarisation, and transmitting the polarisation multiplexed signal.

26 Claims, 11 Drawing Sheets

(56) References Cited

U.S. PATENT DOCUMENTS

2014/0023368 A1* 1/2014 Bhandare ............... H04J 14/06
398/65
2015/0207569 A1 7/2015 Bhandare et al.
2018/0109348 A1* 4/2018 Salsi ................... H04J 14/0202

OTHER PUBLICATIONS

International Search Report and Written Opinion, dated Sep. 8, 2017, from corresponding/related International Application No. PCT/EP2016/080599.
M. Morsy-Osman et al., "1λ × 224 Gb/s 10 km Transmission of Polarization Division Multiplexed PAM-4 Signals Using 1.3 μm SiP Intensity Modulator and a Direct-Detection MIMO-based Receiver", ECOC, 2014, Cannes, France.

* cited by examiner

METHODS AND APPARATUS FOR DUAL POLARISATION OPTICAL COMMUNICATION

TECHNICAL FIELD

The present disclosure relates to methods and apparatus for dual polarisation optical transmission and reception, and to a computer program configured to carry out methods for dual polarisation optical transmission and reception.

BACKGROUND

Dual polarisation optical communication involves transmitting over two linear and orthogonal polarisation states, and is a widespread technique used to double channel capacity. Dual polarisation is used in current 100 Gbit/s Dense Wavelength Division Multiplexing (DWDM) coherent systems, with the total capacity split into two 50 Gbit/s Quadrature Phase Sift Keying (QPSK) sub-channels. The two sub-channels remain orthogonal, even after propagating over thousands of kilometres of optical fibre, but they arrive at the receiver with their polarisation axes randomly oriented with respect to the polarisation axis of a local oscillator at the receiver. In order to recover the information sent on the two polarisations states, coherent receivers use a polarisation diversity optical front-end followed by an equalizer, implemented on proprietary design Application Specific Integrated Circuits (ASICs). These elements consume additional power and their development costs are reflected in an increase in the cost of the receiver.

Direct detection 100 Gbit/s optical interfaces are an appealing alternative to coherent systems to achieve cost and energy efficient transmission over short haul distances, typically less than 20 km. Such distances are common for example in fronthaul links between Remote Radio Units (RRUs) and Digital Units (DUs). Examples of direct detection 100 Gbit/s optical interfaces include 4 level Pulse Amplitude Modulation (PAM4) or Discrete Multitone (DMT). The cost and energy savings offered by such interfaces arise from the absence of a local oscillator and the low complexity level of the digital post-processing at the receiver.

A difficulty with direct detection 100 Gbit/s interfaces arises in their use for dual polarisation communication. The equalisers present in coherent systems, in which both amplitude and phase of the received optical signal may be recovered, and which may be used for polarisation recovery, are not usually present in phase insensitive direct detection systems. Recovering the information sent on each orthogonal polarisation in such systems therefore requires alternative equipment such as Stokes receiver or a polarisation recovery device, which may be realised in integrated photonics. Each of these alternatives has distinct drawbacks.

A Stokes receiver requires optical splitters, four photodiodes and a Digital Signal Processor (DSP). Although the DSP is simpler than that required for a coherent system, it introduces extra complexity and power consumption that would be preferable to avoid. Integrated polarisation recovery devices are an appealing alternative to a Stokes receiver, and in single polarisation transmission with polarisation sensitive receivers, these devices can be used to rotate the polarisation of the received optical signal until the photo-detected signal achieves its maximum power value. Receivers with a silicon photonic optical frontend (which can be used for channel selection, channel add-drop or chromatic dispersion compensation) are an example of polarisation sensitive receivers, as silicon photonic integrated circuits usually support a single linearly polarised propagation mode, for example the Transverse Electric (TE) propagation mode.

Although polarisation recovery devices that allow continuous and smooth transformation from any input State of Polarisation (SOP) to any output SOP are possible in theory, practical devices may present implementation constraints and risk to trap the system in a sub-optimal operation point. Additionally, the use of polarisation recovery devices for dual polarisation systems is complicated, as the devices cannot use maximization of the received signal power as a convergence criterion. In a dual polarised received signal, signal power remains constants regardless of the polarisation rotation angle, as power that is lost on one polarisation axis is gained on the orthogonal axis. Bit Error Rate (BER) minimisation could be used as alternative convergence criterion but, to avoid occasional random polarisation swaps, the two transmitted orthogonal polarisations would need to be marked with different training sequences as part of the signal channel framing protocol. This would require an update of standard protocols that have been stable for some time, including for example the Optical Transport Network (OTN) standard described in ITU-T Recommendation G.709. Additionally, it is desirable to avoid any dependence of a polarisation recovery mechanism on the subsequent receiver implementation, and hence on framing protocol, BER acquisition time, Forward Error Correction (FEC) type, etc.

It can be appreciated from the above discussion that realisation of dual polarisation optical communication that is compatible with direct detection systems remains an ongoing challenge.

SUMMARY

According to a first aspect of the present disclosure, there is provided a method for dual polarisation optical transmission. The method comprises splitting a continuous wave light source into first and second sub-channels and optically modulating each sub-channel with a data signal. The method further comprises superimposing a first pilot tone onto the first optically modulated sub-channel and a second pilot tone, different from the first pilot tone, onto the second optically modulated sub-channel. The method further comprises polarisation multiplexing the first and second sub-channels to form a polarisation multiplexed signal, in which the first and second sub-channels have orthogonal states of polarisation, and transmitting the polarisation multiplexed signal.

According to examples of the present disclosure, a frequency of each of the first and second pilot tones may be selected from a frequency range at which power spectral density of the corresponding optically modulated sub-channel is negligible. The frequency of the first and second pilot tones may for example be less than or equal to 10 MHz and may for example be 5 MHz for a 1 Gbit/s signal encoded with an 8B10B code.

According to examples of the present disclosure, the first and second pilot tones may be superimposed onto the respective sub-channel using dedicated amplitude modulators, using low frequency modulation of the bias of the sub-channel modulators used to optically modulate the sub-channels with a data signal, by addition of the pilot tone to the electrical data signal etc.

According to examples of the present disclosure, examples of modulation schemes that may be used include Duobinary Modulation, DMT, PAM, On-Off Keying (OOK), etc.

According to another aspect of the present disclosure, there is provided a method for dual polarisation optical reception. The method comprises splitting a received polarisation multiplexed signal onto first and second optical paths, the received polarisation multiplexed signal comprising first and second sub-channels, the first sub-channel having superimposed a first pilot tone and the second sub-channel having superimposed a second pilot tone. The method further comprises, on each of the first and second paths, using maximisation of power of one of the first or second pilot tones for polarisation recovery of one of the first or second sub-channels. Optionally, maximisation of power of one of the first or second pilot tones and minimisation of power of the other of the first or second pilot tones is used as a convergence condition for polarisation recovery of one of the first or second sub-channels.

According to examples of the present disclosure, the pilot tone for which power is maximised on the first optical path may be the pilot tone for which power is minimised on the second optical path.

According to examples of the present disclosure, the method may further comprise, on each of the first and second paths, using direct detection to receive the polarisation recovered sub-channel.

According to examples of the present disclosure, using maximisation of power of one of the first or second pilot tones for polarisation recovery of one of the first or second sub-channels may comprise passing the received polarisation multiplexed signal on the path through a polarisation recovery device, the polarisation recovery device having at least one control variable, on output from the polarisation recovery device, extracting the first and second pilot tones, estimating a power of the pilot tones, and adjusting a value of the control variable of the polarisation recovery device until a power of one of the first or second pilot tones reaches a convergence threshold. Optionally, maximisation of power of one of the first or second pilot tones and minimisation of power of the other of the first or second pilot tones is used as a convergence condition for polarisation recovery of one of the first or second sub-channels.

According to examples of the present disclosure, the convergence threshold may comprise one of a high convergence threshold for a pilot tone for which power is maximised or a low convergence threshold for a pilot tone for which power is minimised.

According to examples of the present disclosure, extracting the first and second pilot tones may comprise one of tapping the signal output from the polarisation recovery device and, on a low power output of the optical tap, photodetecting and filtering the signal to retain only the first and second pilot tones, or photodetecting the signal output from the polarisation recovery device and isolating the first and second pilot tones. According to some examples, isolating the first and second pilot tones may comprise electrical digital or analogue filtering.

According to examples of the present disclosure, using direct detection to receive the polarisation recovered sub-channel may comprise, when the power of one of the first or second pilot tones reaches a convergence threshold, performing direct detection the signal output from the polarisation recovery device.

According to examples of the present disclosure, extracting the first and second pilot tones may comprise tapping the signal output from the polarisation recovery device, and, on a low power output of the optical tap, photodetecting and filtering the signal to retain only the first and second pilot tones. According to such examples of the present disclosure, using direct detection to receive the polarisation recovered sub-channel may comprise, when the power of one of the first or second pilot tones reaches a convergence threshold, performing direct detection a signal output from a high power output of the optical tap.

According to examples of the present disclosure, adjusting a value of the control variable of the polarisation recovery device until a power of one of the first or second pilot tones reaches a convergence threshold may comprises, for a reference value of the control variable, adding an offset to the reference value of the control variable and estimating a resulting power of the extracted first and second pilot tones. Adjusting may further comprise removing the offset from the reference value of the control variable and estimating a resulting power of the extracted first and second pilot tones, and if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value, updating the reference value of the control variable by an adjustment value.

According to examples of the present disclosure, estimating a power of the pilot tones may comprise using a Fast Fourier Transform (FFT).

According to examples of the present disclosure, the adjustment value may be proportional to a largest increase in estimated pilot tone power caused by application of the offset value, divided by the offset value.

According to examples of the present disclosure, adjusting a value of the control variable of the polarisation recovery device until a power of one of the first or second pilot tones reaches a convergence threshold may further comprise, if the condition discussed above is not satisfied, updating the reference value of the control variable to be a selected value within a setting range for the control variable. According to examples of the present disclosure, the selected value may be a randomly selected value from within the setting range, or may be selected from a look-up table of values within the selected range. For example, a series of possible values within the selected range may be provided, and each possible value may be selected in turn.

According to examples of the present disclosure, adjusting a value of the control variable of the polarisation recovery device until a power of one of the first or second pilot tones reaches a convergence threshold may further comprise repeating the steps discussed above until an estimated power of one of the first or second pilot tones reaches a convergence threshold.

According to examples of the present disclosure, when repeating the steps discussed above, the reference value for the control variable may comprise the updated value for the control variable from the preceding repetition. For initial performance of the steps discussed above, the reference value may comprise a selected value within a setting range for the control variable. As discussed above, the selected value may be randomly selected, selected from a lookup table etc.

According to examples of the present disclosure, the polarisation recovery device may have a plurality of control variables, and using maximisation of power of one of the first or second pilot tones and minimisation of power of the other of the first or second pilot tones as a convergence condition for polarisation recovery of one of the first or second sub-channels may further comprise adjusting a value of each of the control variables of the polarisation recovery device until a power of one of the first or second pilot tones reaches a convergence threshold.

According to examples of the present disclosure, the method may further comprise, if a power of one of the first or second pilot tones does not reach a convergence threshold within a target number of adjustments, updating the reference value of the control variable to be a selected value within a setting range for the control variable. According to examples of the present disclosure, the target number of adjustments may be determined on the basis of a speed of state of polarisation variation of the received polarisation multiplexed signal and a speed of computation of the steps discussed above. The process may then be restarted from the newly selected value within the setting range for the control variable.

According to examples of the present disclosure, if, after adjustment of a value of the control variable, a power of both pilot tones increases or decreases, the method may further comprise concluding that an orthogonality of the first and second sub-channels has been lost.

According to examples of the present disclosure, if, after multiple adjustments of a value of the control variable, a power of the first and second pilot tones remains substantially unchanged, the method may further comprise concluding that an orthogonality of the first and second sub-channels has been lost.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to a preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according a preceding aspect of the present disclosure.

According to another aspect of the present disclosure, there is provided apparatus for dual polarisation optical transmission. The apparatus comprises a splitter configured to split a continuous wave light source into first and second sub-channels, and first and second modulation elements configured to optically modulate each sub-channel with a data signal and to superimpose different first and second pilot tones onto the first and second optically modulated sub-channels. The apparatus further comprises a polarisation combiner configured to polarisation multiplex the first and second sub-channels to form a polarisation multiplexed signal, in which the first and second sub-channels have orthogonal states of polarisation, and a transmitter configured to transmit the polarisation multiplexed signal.

According to examples of the present disclosure, each of the first and second modulation elements comprises a data sub-channel optical modulator, and a pilot tone amplitude modulator.

According to examples of the present disclosure, each modulation element may comprise a single optical modulator, with pilot tone insertion being accomplished via low frequency modulation of the bias of the optical modulator, or by addition of the pilot tone to the electrical data signal. In further examples, pilot tone modulation may be performed using existing elements, such as in place bias electrical lines.

According to another aspect of the present disclosure, there is provided apparatus for dual polarisation optical transmission. The apparatus is adapted to split a continuous wave light source into first and second sub-channels, to optically modulate each sub-channel with a data signal, and to superimpose a first pilot tone onto the first optically modulated sub-channel and a second pilot tone, different from the first pilot tone, onto the second optically modulated sub-channel. The apparatus is further adapted to polarisation multiplex the first and second sub-channels to form a polarisation multiplexed signal, in which the first and second sub-channels have orthogonal states of polarisation and to transmit the polarisation multiplexed signal.

According to another aspect of the present disclosure, there is provided apparatus for dual polarisation optical transmission, the apparatus comprising a processor and a memory. The memory contains instructions executable by the processor such that the apparatus is operative to split a continuous wave light source into first and second sub-channels, optically modulate each sub-channel with a data signal, and superimpose a first pilot tone onto the first optically modulated sub-channel and a second pilot tone, different from the first pilot tone, onto the second optically modulated sub-channel. The apparatus is further operative to polarisation multiplex the first and second sub-channels to form a polarisation multiplexed signal, in which the first and second sub-channels have orthogonal states of polarisation, and transmit the polarisation multiplexed signal.

According to another aspect of the present disclosure, there is provided apparatus for dual polarisation optical reception. The apparatus comprises a splitter configured to split a received polarisation multiplexed signal onto first and second optical paths, the received polarisation multiplexed signal comprising first and second sub-channels, the first sub-channel having superimposed a first pilot tone and the second sub-channel having superimposed a second pilot tone. The apparatus further comprises a first polarisation recovery device configured to receive a signal on the first optical path and a second polarisation recovery device configured to receive a signal on the second optical path, and a convergence unit configured to use maximisation of power of one of the first or second pilot tones for polarisation recovery of one the first and second sub-channels in the first and second polarisation recovery devices. Optionally, maximisation of power of one of the first or second pilot tones and minimisation of power of the other of the first or second pilot tones is used as a convergence condition for polarisation recovery of one of the first or second sub-channels.

According to examples of the present disclosure, the apparatus may further comprise a first direct detection receiver configured to receive a polarisation recovered signal from the first polarisation recovery device and a second direct detection receiver configured to receive a polarisation recovered signal from the second polarisation recovery device.

According to examples of the present disclosure, each of the first and second polarisation recovery devices may have at least one control variable, and the convergence unit may comprise first and second extraction units, each extraction unit configured to extract the first and second pilot tones from a signal output from a respective polarisation recovery device. The convergence unit may further comprise a processing unit configured to estimate a power of the first and second pilot tones on the signals output from each of the polarisation recovery devices and to adjust a value of the control variable for each polarisation recovery device until a power of one of the first or second pilot tones on the signal output from the respective polarisation recovery device reaches a convergence threshold.

According to examples of the present disclosure, each of the first and second extraction units may comprise an optical tap and a direct detection unit configured to photodetect and filter a signal on a low power output of the optical tap to retain only the first and second pilot tones.

According to examples of the present disclosure, the processing unit may be configured to adjust a value of the control variable for each polarisation recovery device until a power of one of the first or second pilot tones on the signal output from the respective polarisation recovery device reaches a convergence threshold by, for a reference value of the control variable, adding an offset to the reference value of the control variable and estimating a resulting power of the first and second pilot tones obtained from the optical tap, removing the offset from the reference value of the control variable and estimating a resulting power of the first and second pilot tones obtained from the optical tap, and if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value, updating the reference value of the control variable by an adjustment value.

According to examples of the present disclosure, the processing unit may comprise a digital signal processor.

According to another aspect of the present disclosure, there is provided apparatus for dual polarisation optical reception. The apparatus is adapted to split a received polarisation multiplexed signal onto first and second optical paths, the received polarisation multiplexed signal comprising first and second sub-channels, the first sub-channel having superimposed a first pilot tone and the second sub-channel having superimposed a second pilot tone, and, on each of the first and second paths, use maximisation of power of one of the first or second pilot tones for polarisation recovery of one of the first or second sub-channels. Optionally, maximisation of power of one of the first or second pilot tones and minimisation of power of the other of the first or second pilot tones is used as a convergence condition for polarisation recovery of one of the first or second sub-channels.

According to examples of the present disclosure, apparatus may be further adapted to, on each of the first and second paths, use direct detection to receive the polarisation recovered sub-channel.

According to another aspect of the present disclosure, there is provided apparatus for dual polarisation optical reception, the apparatus comprising a processor and a memory. The memory contains instructions executable by the processor such that the apparatus is operative to split a received polarisation multiplexed signal onto first and second optical paths, the received polarisation multiplexed signal comprising first and second sub-channels, the first sub-channel having superimposed a first pilot tone and the second sub-channel having superimposed a second pilot tone, and, on each of the first and second paths, use maximisation of power of one of the first or second pilot tones for polarisation recovery of one of the first or second sub-channels. Optionally, maximisation of power of one of the first or second pilot tones and minimisation of power of the other of the first or second pilot tones is used as a convergence condition for polarisation recovery of one of the first or second sub-channels.

According to examples of the present disclosure, the apparatus may be further operative to, on each of the first and second paths, use direct detection to receive the polarisation recovered sub-channel.

According to another aspect of the present disclosure, there is provided a system for dual polarisation optical communication. The system comprises apparatus for dual polarisation optical transmission according to any preceding aspect of the present disclosure, and apparatus for dual polarisation optical reception according to any preceding aspect of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Examples of the present disclosure provide methods for dual polarisation optical transmission and reception according to which the two orthogonal sub-channels of a dual polarised optical beam are marked with different pilot signals before being combined. The frequency of the pilot signals is selected from a frequency range at which power spectral density of the corresponding optically modulated sub-channel is negligible, so as to facilitate eventual extraction of the pilot signals and to avoid interference. When the dual polarised beam is received, the received signal is split onto two optical paths. On each path, the signal is passed through a polarisation recovery device and the pilot tones are then extracted from the resulting signal. The maximisation of power of one of the pilot tones, optionally together with minimisation of power of the other pilot tone, is then used as a convergence criterion for the polarisation recovery device on each path. Once a pilot tone signal power has reached a maximum or minimum threshold, polarisation is deemed to be recovered for the associated sub-channel, and the sub-channel signal can be received and photodetected at the output of the polarisation recovery device. Examples of the present disclosure thus enable polarisation recovery of a dual polarised optical signal without the need for a Stokes receiver, equaliser or other apparatus that is high in energy consumption and cost. Examples of the present disclosure are thus appropriate for use with non-coherent systems, including those employing direct detection.

Figure 1:
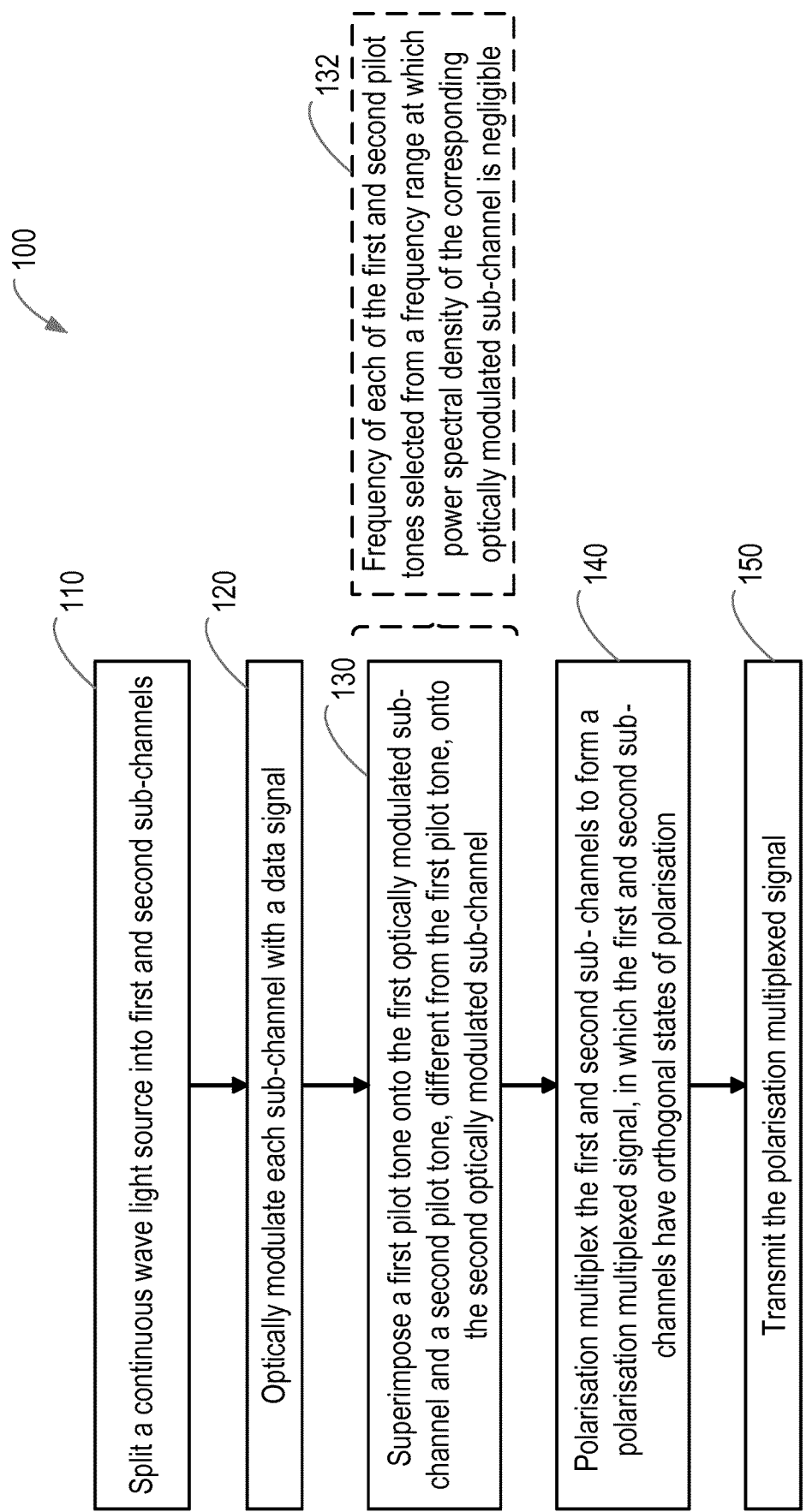
FIG. 1 is a flow chart illustrating process steps in a method for dual polarisation optical transmission.

FIG. 1 is a flow chart illustrating a first example of a method 100 for dual polarisation optical transmission according to an example of the present disclosure. The method may be carried out by an optical transmitting apparatus. Referring to FIG. 1, in a first step 110, the method comprises splitting a continuous wave light source into first and second sub-channels. The continuous wave light source may for example be a laser. The method then comprises, in step 120, optically modulating each sub-channel with a data signal. The optical modulation technology and format may be selected according to a particular use case, and in one example, the modulation scheme may be compatible with a direct detection receiver. Examples of such modulation schemes include Duobinary Modulation, DMT, PAM, On-Off Keying (OOK) or other modulation schemes. In step 130, the method 100 comprises superimposing a first pilot tone onto the first optically modulated sub-channel and a second pilot tone, different from the first pilot tone, onto the second optically modulated sub-channel. The first and second pilot tones may be superimposed onto the respective sub-channel using dedicated amplitude modulators, using low frequency modulation of the bias of the sub-channel modulators used to optically modulate the sub-channels with a data signal, by addition of the pilot tone to the electrical data signal etc.

As illustrated in step 132, a frequency of each of the first and second pilot tones may be selected from a frequency range at which power spectral density of the corresponding optically modulated sub-channel is negligible. This may facilitate pilot tone recovery at a receiver, as well as avoiding the introduction of a performance penalty on the data signal. Widespread encoding techniques like Manchester, 8B10B, 64B66B, etc., deplete the signal spectrum around the DC level and would be suitable for use with low frequency pilot tones, from a few KHz to a few MHz for signal bit rates above 1 Gbit/s. For example, the frequency of the first and second pilot tones may be less than or equal to 10 MHz and may for example be 5 MHz.

In step 140, the method 100 comprises polarisation multiplexing the first and second sub-channels to form a polarisation multiplexed signal, in which the first and second sub-channels have orthogonal states of polarisation. Finally, in step 150, the method 100 comprises transmitting the polarisation multiplexed signal.

The method 100 of FIG. 1 thus ensures that each sub-channel of a polarisation multiplexed optical signal is marked by being associated with a specific pilot tone.

These pilot tones may then be used in a receiver to recover the polarisation state of each sub channel, as discussed below with reference to FIGS. 2 and 3.

Figure 2:
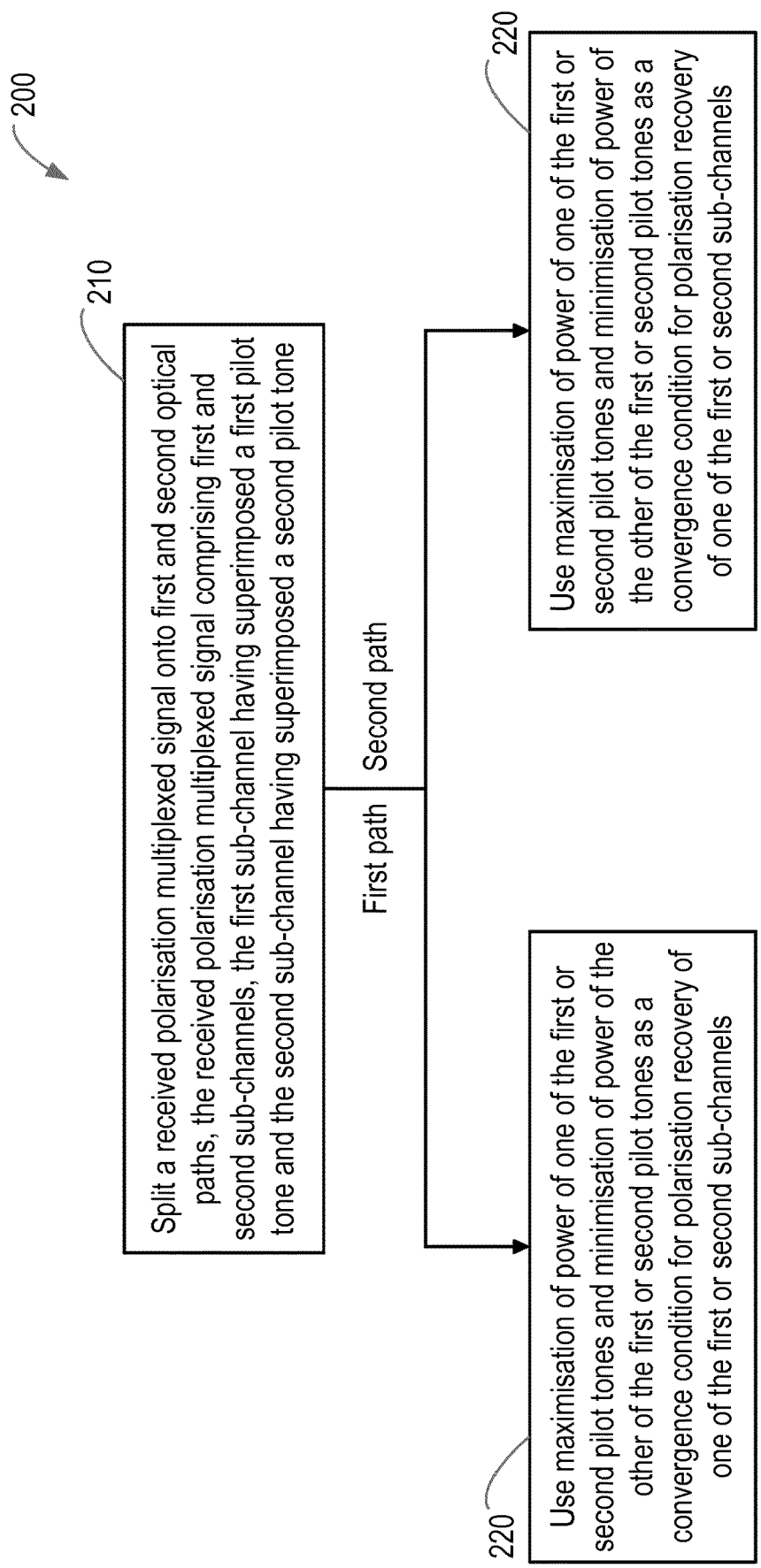
FIG. 2 is a flow chart illustrating process steps in a method for dual polarisation optical reception.

FIG. 2 is a flow chart illustrating a first example of a method 200 for dual polarisation optical reception according to an example of the present disclosure. The method may be carried out by an optical receiving apparatus. Referring to FIG. 2, in a first step 210, the method comprises splitting a received polarisation multiplexed signal onto first and second optical paths, the received polarisation multiplexed signal comprising first and second sub-channels, the first sub-channel having superimposed a first pilot tone and the second sub-channel having superimposed a second pilot tone. The method 200 then comprises in step 220, on each of the first and second paths, using maximisation of power of one of the first or second pilot tones and optionally minimisation of power of the other of the first or second pilot tones as a convergence condition for polarisation recovery of one of the first or second sub-channels. In some examples of the present disclosure, the pilot tone for which power is maximised on the first optical path is the pilot tone for which power is minimised on the second optical path, thus ensuring that a polarisation state of a different sub-channel is recovered on each of the first and second optical paths. One example way in which the process of using maximisation of power of one of the first or second pilot tones and minimisation of power of the other of the first or second pilot tones as a convergence condition for polarisation recovery of one of the first or second sub-channels may be achieved is illustrated in FIG. 3.

Figure 3A:
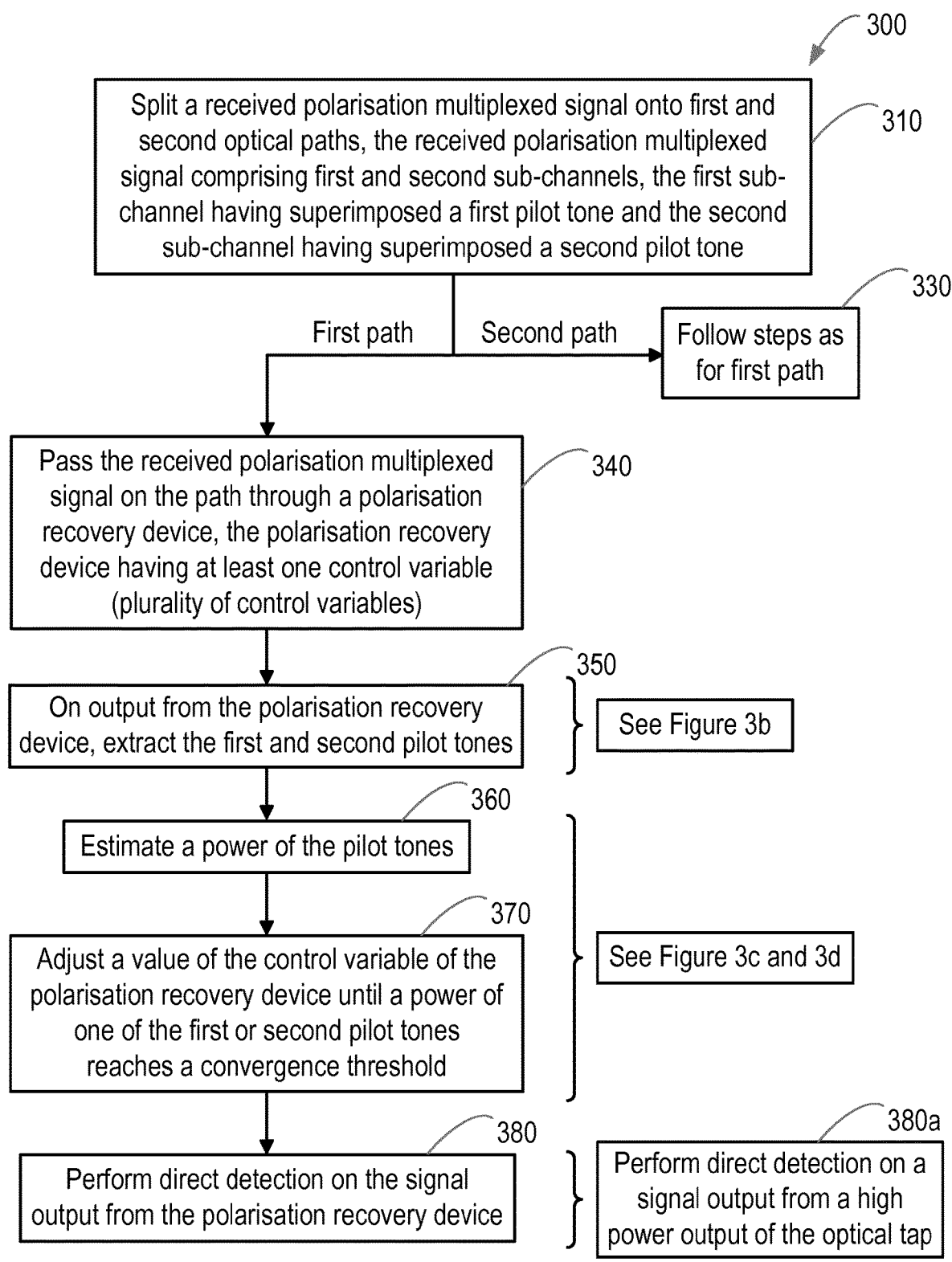
FIGS. 3a to 3d are flow charts illustrating process steps in another example of a method for dual polarisation optical transmission.

FIGS. 3a to 3d are flow charts illustrating another example of a method 300 for dual polarisation optical reception. The method may be carried out by an optical receiving apparatus. Referring to FIG. 3a, in a first step 310, the method 300 comprises splitting a received polarisation multiplexed signal onto first and second optical paths, the received polarisation multiplexed signal comprising first and second sub-channels, the first sub-channel having superimposed a first pilot tone and the second sub-channel having superimposed a second pilot tone. Subsequent steps of the method 300 are illustrated in detail for the first path only, although it will be appreciated that equivalent steps are also conducted 330 on the second path. Referring again to FIG. 3a, on the first path, the method 300 then comprises passing the received polarisation multiplexed signal on the path through a polarisation recovery device in step 340, the polarisation recovery device having at least one control variable. In some examples of the present disclosure, the polarisation recovery device may have a plurality of control variables, and, in practical polarisation recovery devices, may for example have two or three control variables. The control variables may for example be voltages or currents. Each control variable may have a setting range of values which the control variable may take. On output from the polarisation recovery device, the method 300 comprises, at step 350, extracting the first and second pilot tones.

Figure 3B:
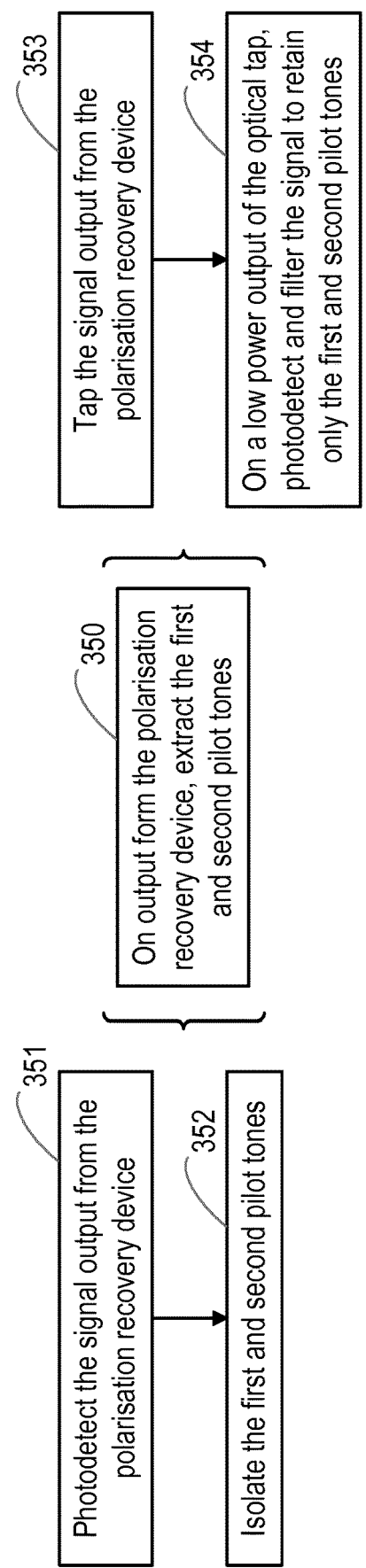

As illustrated in FIG. 3b, the step 350 of extracting the first and second pilot tones may be achieved in different ways. In one example, extracting the first and second pilot tones may comprise, in step 351, photodetecting the signal output from the polarisation recovery device, and, in step 352, isolating the first and second pilot tones. The first and second pilot tones may be isolated in step 352 using electrical digital or analogue filtering. In another example, extracting the first and second pilot tones may comprise, in step 353, tapping the signal output from the polarisation recovery device and, in step 354, on a low power output of the optical tap, photodetecting and filtering the signal to retain only the first and second pilot tones. Using low frequency pilot tones, cost effective low bandwidth optical receivers may be used to detect the pilot tones and filter out the data signal, following which the pilot tones may be subjected to analog-to-digital conversion.

Referring again to FIG. 3a, having extracted the first and second pilot tones, the method comprises, in step 360, estimating a power of the pilot tones, for example using a FFT, and, in step 370, adjusting a value of the control variable (or variables) of the polarisation recovery device until a power of one of the first or second pilot tones reaches a convergence threshold. Once a power of one of the first or second pilot tones reaches a convergence threshold, the polarisation state of the sub-channel associated with the pilot tone the power of which has been maximised has been recovered. The method therefore comprises, at step 380, performing direct detection of the signal output from the polarisation recovery device to receive the polarisation recovered sub-channel. As illustrated in step 380a, in examples in which the first and second pilot tones are extracted using an optical tap, the direct detection of the polarisation recovered sub-channel may be performed on a signal output from a high power output of the optical tap.

In some examples of the present disclosure, the performance of steps 360 and 370 of the method 300 (estimating a power of the pilot tones and adjusting a value of the control variable (or plurality of variables) of the polarisation recovery device until a power of one of the first or second pilot tones reaches a convergence threshold) may involve applying a two stage algorithm, as set out below. It is assumed that, at reasonable calculation speed for the algorithm, any State of Polarisation (SOP) variation of the received signal is sufficiently slow to allow time for the algorithm set out below to converge. It will be appreciated that typical SOP variation times are higher than 10 ms.

Parameters for the algorithm which may implement steps 360 and 370 are defined as follows:

n identifies the current iteration; n=0 . . . $N_{max}$, where $N_{max}$ is the maximum number of allowed iterations. The maximum number of iterations may be fixed according to a combination of an SOP variation time for the received signal and a calculation speed for the algorithm.

l=1 or 2 identifies the first and second optical path at the receiving apparatus conducting the method 300.

k=1 . . . K is the $k^{th}$ control variable of each polarisation recovery device (one for each of the first and second optical paths). Typically, K=2 or 3.

t=1 or 2 identifies the first and second pilot tones respectively.

$\vartheta_{k,l}(n)$ is the value of the $k^{th}$ control variable of the $l^{th}$ polarisation recovery device at the $n^{th}$ iteration.

$\overline{\vartheta}_l = [\vartheta_{1,l}(n), \vartheta_{2,l}(n), \ldots, \vartheta_{K,l}(n)]^T$ $P_{t,l}(\overline{\vartheta}_l(n))$ or, briefly, $P_{t,l}(n)$ is the power of the $t^{th}$ pilot tone on the $l^{th}$ path.

α is a proportionality coefficient used to update $\overline{\vartheta}_l(n)$ to $\overline{\vartheta}_l(n+1)$. α thus controls the way in which values of the control variables are updated from one iteration to the next.

δ is an offset value used to adjust the control variables.

$P^+_{t,l,k}(n) = P_{t,l}(\vartheta_{1,l}(n), \vartheta_{2,l}(n), \ldots \vartheta_{k,l}(n)+\delta, \ldots, \vartheta_{K,l}(n))$, i.e. the power of the $t^{th}$ pilot tone on the $l^{th}$ path with δ added to the $k^{th}$ control variable.

$P^-_{t,l,k}(n) = P_{t,l}(\vartheta_{1,l}(n), \vartheta_{2,l}(n), \ldots \vartheta_{k,l}(n)-\delta, \ldots, \vartheta_{K,l}(n))$, i.e. the power of the $t^{th}$ pilot tone on the $l^{th}$ path with δ subtracted from the $k^{th}$ control variable.

$\overline{P}^+_{t,l}(n) = [P^+_{t,l,1}(n), P^+_{t,l,2}(n), \ldots, P^+_{t,l,K}(n)]^T$ $\overline{P}^-_{t,l}(n) = [P^-_{t,l,1}(n), P^-_{t,l,2}(n), \ldots, P^-_{t,l,K}(n)]^T$ $\vartheta_{random,k}$ is a random variable, having uniform probability density over the setting range of the $k^{th}$ control variable. Variables generated at different iterations, i.e. for different values of n, are independent on each other. In some examples of the algorithm, the random variable may be replaced with a variable selected, for example from a lookup table or other ordered or non-ordered sequence of possible values within the setting range of the $k^{th}$ control variable.

At each iteration, the algorithm for performing steps 360 and 370 of the method 300 performs two macro-steps.

In the first macro step, a small offset, δ, is added to and subtracted from each control variable, with the other variables kept constant, and corresponding changes to the estimated pilot tone powers are measured. In this way, $\overline{P}^+_{t,l}(n)$, and $\overline{P}^-_{t,l}(n)$, are derived.

It will be appreciated that the first macro step is in fact a logical step that corresponds to K sub-steps. At each sub-step:

A positive offset is added to the value of one control variable, keeping the other control variables constant, and new power values of the pilot tones are estimated. The modified control variable is then reset to the value it had before the offset introduction. A negative offset is then added to the value of the control variable, keeping the other control variables constant, and new power values of the pilot tones are estimated. The modified control variable is then reset to the value it had before the offset introduction.

In the second macro step, described below for the first optical path only, although equivalent actions are performed on the second optical path, new values of the control variables are established according to the following algorithm (a variant of the gradient algorithm):

For k = 1, . . . K
  If $(P^+_{1,1,k}(n) > P_{1,1}(n)$ and $P^+_{2,1,k}(n) \leq P_{2,1}(n))$ or $(P^-_{1,1,k}(n) > P_{1,1}(n)$
and
  $P^-_{2,1,k}(n) \leq P_{2,1}(n))$
  then $$\theta_{k,1}(n+1) = \theta_{k,1}(n) + \alpha \cdot \frac{\max(P^+_{1,1,k}(n) P^-_{1,1,k}(n)) - P_{1,1}(n)}{\delta}$$

else
    $\theta_{k,1}(n+1) = \theta_{random,k}$
  end if
end For

The above algorithm has the effect that for each control variable, if, after addition or removal of the offset δ to the value of the control variable, an estimated power of one of the first or second pilot tones is greater than when the control variable was at its previous value, before the offset was applied, and a power of the other of the first or second pilot tones is less than or equal to when the control variable was at its previous value, before the offset was applied, then the value of the control variable is updated by an adjustment value. The adjustment value is proportional to a largest increase in estimated pilot tone power caused by application of the offset value, divided by the offset value. If the condition set out immediately above is not satisfied, then the control variable is set to be a random value within the setting range for the control variable.

The pilot tone for which power increases on the first optical path may be the pilot tone for which power decreases on the second optical path.

This algorithm is repeated until an estimated power of one of the pilot tones reaches a convergence threshold, or until a maximum number of allowed iterations is reached.

Figure 3C:
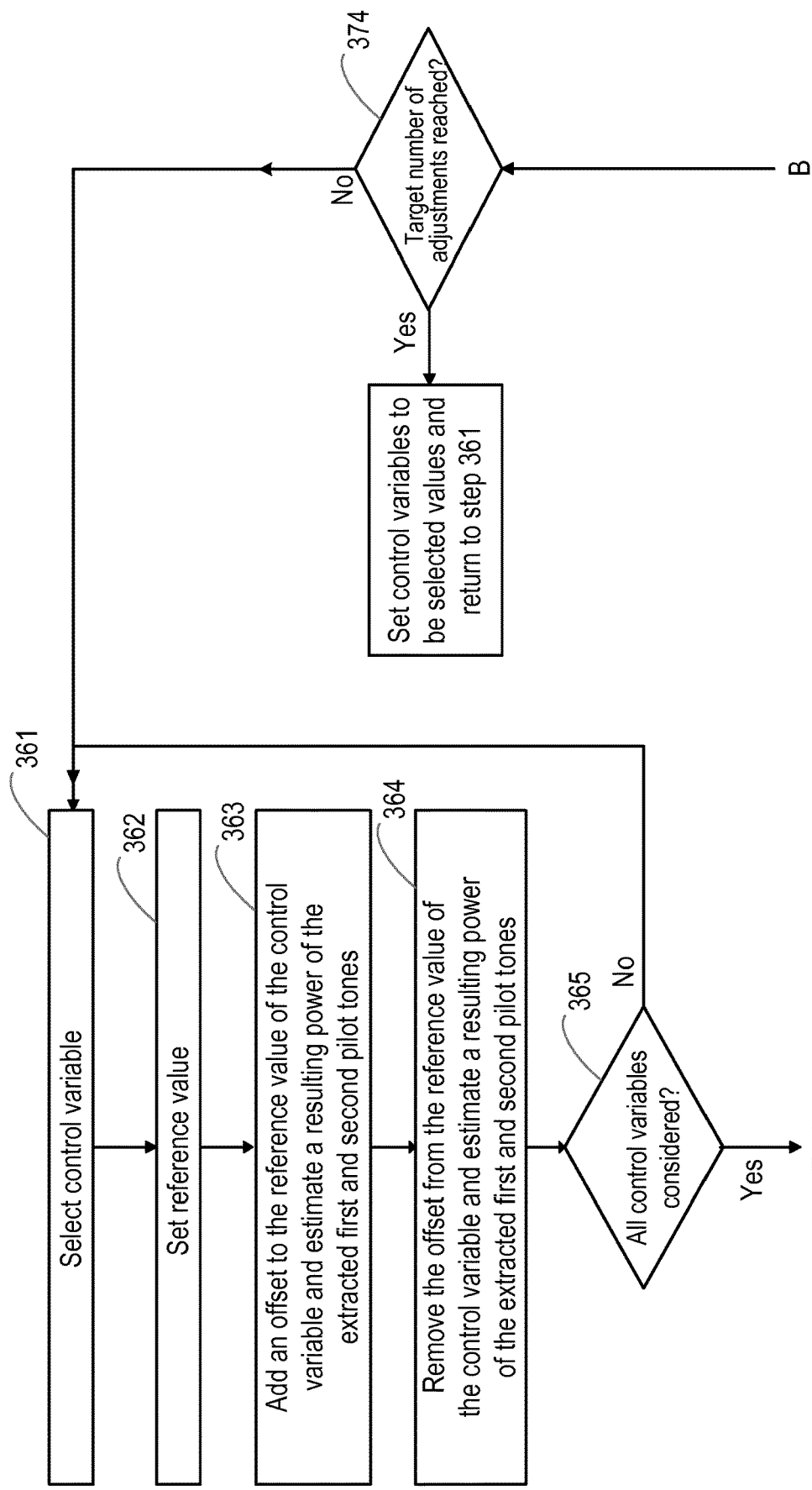
Figure 3D:
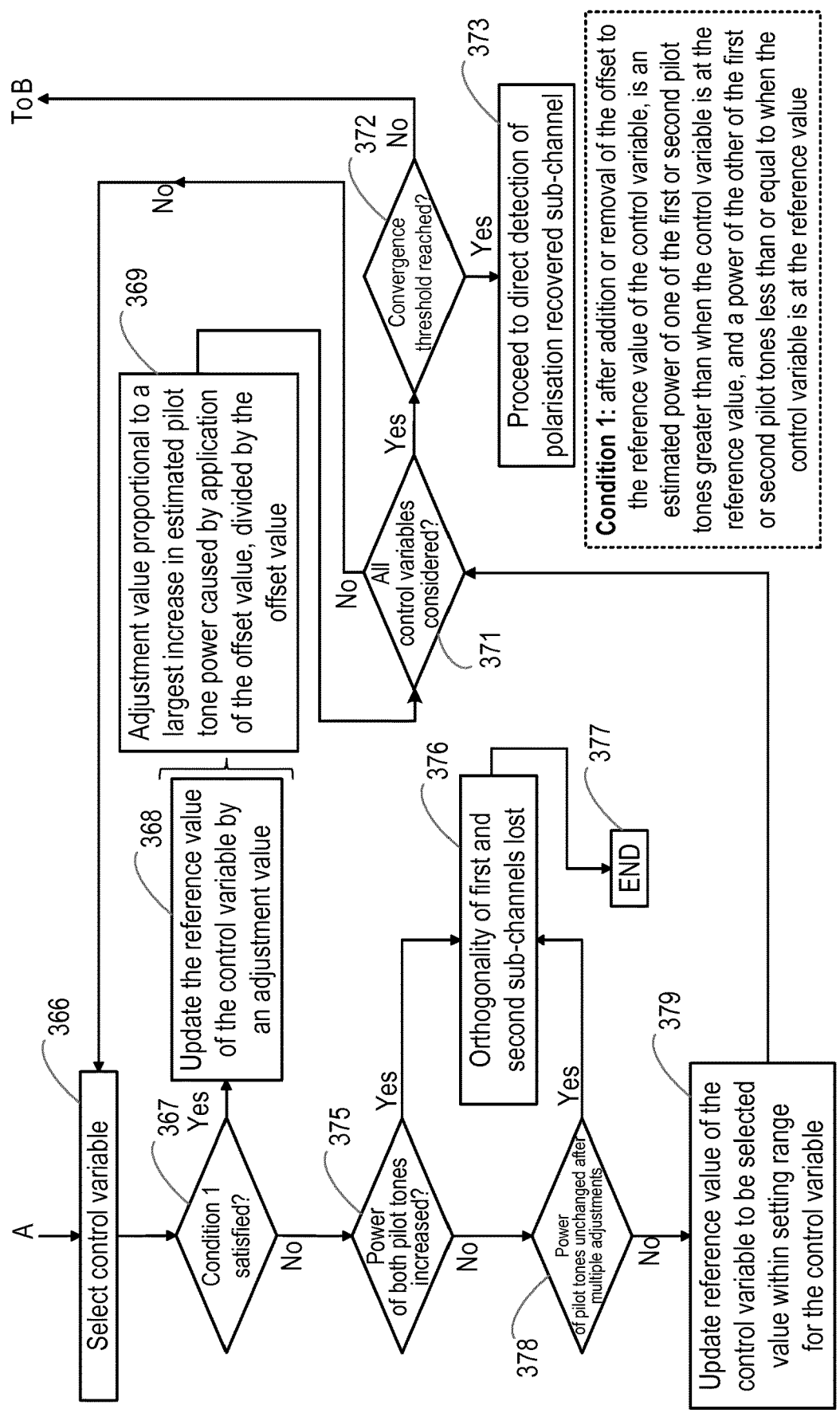

Implementation of steps 360 and 370, using the above described algorithm, is illustrated in FIGS. 3c and 3d, in the form of flow charts demonstrating the process steps to be followed according to the above algorithm. Referring first to FIG. 3c, in step 361, the method comprises selecting a control variable. The method then comprises, in step 362, setting a reference value for the control variable. In a first iteration of the algorithm for steps 360 and 370, the reference value may be a selected value from within the setting range for the control variable, which value may be a randomly selected value or may be selected for a lookup table etc. In step 363, an offset is added to the reference value of the control variable and a resulting power of the extracted first and second pilot tones is estimated. In step 364, the offset is removed from the reference value of the control variable and a resulting power of the extracted first and second pilot tones is estimated. In step 365, the method checks whether all control variables have been considered. If this is not the case, the next control variable is selected and steps 362 to 364 are repeated for the next control variable. Once all control variables have been considered for this first macro step of the algorithm, the method proceeds to the second macro step, illustrated in FIG. 3*d*.

Referring to FIG. 3*d*, in step 366, the method selects a control variable, and then in step 367, the method assesses whether or not the condition for updating the reference value of the control variable is satisfied. This condition is illustrated as Condition 1 in FIG. 3*d*, and discussed above. If the condition is satisfied, that is if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value, the method updates the reference value of the selected control variable by the adjustment value discussed above in step 368. As illustrated in step 369, the adjustment value is proportional to a largest increase in estimated pilot tone power caused by application of the offset value, divided by the offset value. The method then checks, at step 371, whether all control variables have been considered in this second macro step.

Returning to step 367, if it is determined that Condition 1 is not satisfied, the method then checks, at step 375, whether the power of both pilot tones has increased and, if this is not the case, in step 378, whether the power of the pilot tones is substantially unchanged after multiple adjustments. If either of these checks is positive, then it is concluded in step 376 that the orthogonality of the first and second sub-channels has been lost, and the method ends at step 377. If both of the checks at steps 376 and 378 are negative, then the method updates the reference value of the control variable under consideration at step 379 to be a selected value within the setting range for the control variable. The selected value may be a randomly selected value within the setting range or may be selected from a lookup table etc.

Once the value of the control variable has been updated, the method proceeds to step 371, and checks whether all control variables have been considered. If all control variables have not yet been considered, the method returns to step 366 and selects a new control variable. If all control variables have been considered in the second macro step, the method then checks whether a convergence threshold has been reached by one or other of the pilot tone powers in step 372. The convergence threshold may be an upper convergence threshold, for the power of the pilot tone being maximised on the particular optical path, or may be a lower convergence threshold, for the power of the pilot tone being minimised in the particular optical path.

If a convergence threshold has been reached, the method proceeds, at step 373, to direct detection of the polarisation recovered sub channel in step 380, with the control variables at their updated values from the latest iteration of the second macro step (as shown in FIG. 3*a*. If a convergence threshold has not yet been reached, the method first checks, at step 374, whether a target number of adjustments, corresponding to the maximum number of allowed iterations for the algorithm, has been reached. If the maximum number of allowed iterations has been reached, the method proceeds to update the control variables to be selected values from within their setting range, and restarts the first macro step of the algorithm by returning to step 361. If the maximum number of iterations has not yet been reached, the method returns to step 361 and repeats the first macro step, with the reference value for each control variable being set to be the updated value from the previous iteration. This updated value being either the updated value from step 368 or the updated value from a step 379, according to whether or not Condition 1 was satisfied for the relevant control variable in the previous iteration.

Figure 4:
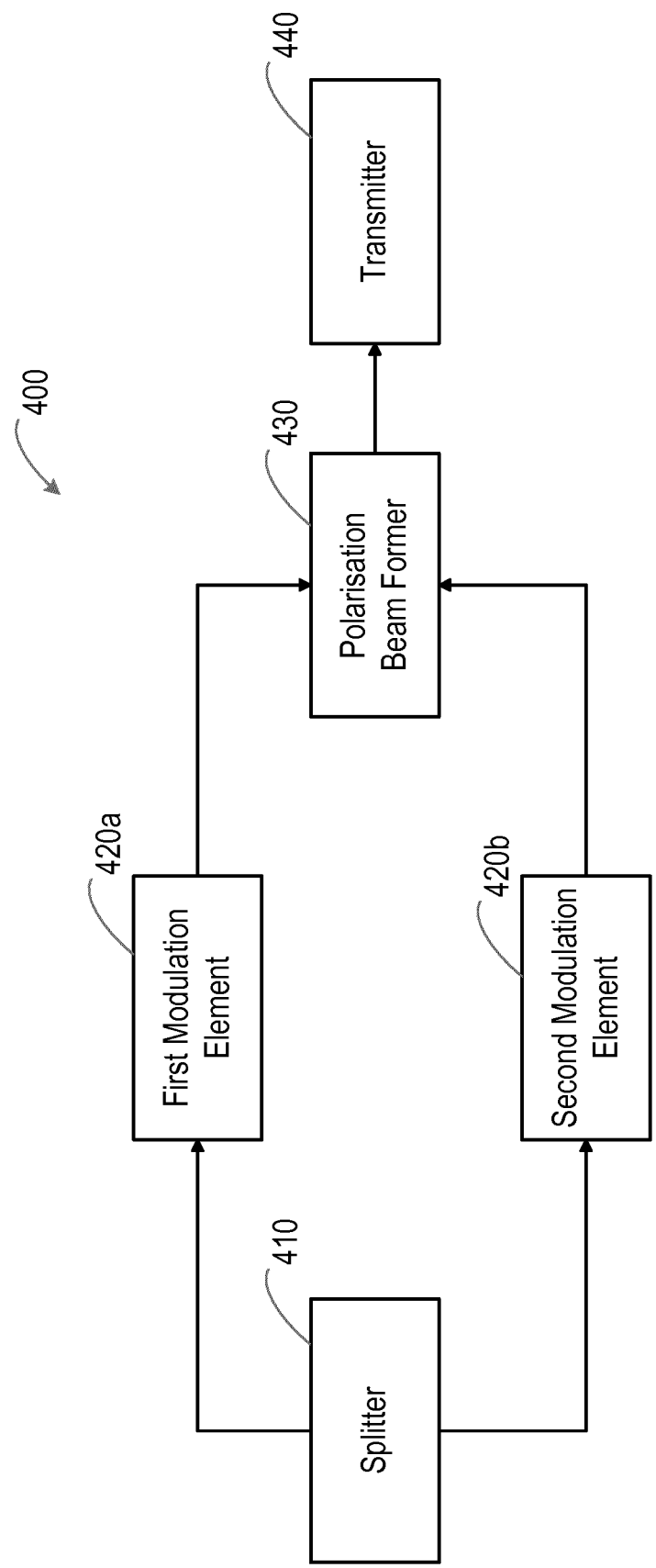
FIG. 4 is a block diagram illustrating elements in an apparatus for dual polarisation optical transmission.

As discussed above, the method 100 may be performed by an optical transmission apparatus, and the methods 200, 300 may be performed by an optical receiving apparatus. FIG. 4 illustrates a first example of an apparatus 400 for dual polarisation optical transmission according to aspects of the present disclosure, which apparatus may perform the method 100 as discussed above. The elements illustrated in FIG. 4 may be logical elements or may be dedicated physical elements. The elements may be implemented in hardware and/or software and may be integrated to any degree. Referring to FIG. 4, the apparatus 400 comprises a splitter 410 configured to split a continuous wave light source into first and second sub-channels. The apparatus 400 also comprises first and second modulation elements 420*a* and 420*b*, configured to optically modulate each sub-channel with a data signal and to superimpose different first and second pilot tones onto the first and second optically modulated sub-channels. The apparatus further comprises a polarisation combiner 430 configured to polarisation multiplex the first and second sub-channels to form a polarisation multiplexed signal, in which the first and second sub-channels have orthogonal states of polarisation, and a transmitter 440 configured to transmit the polarisation multiplexed signal.

Figure 5:
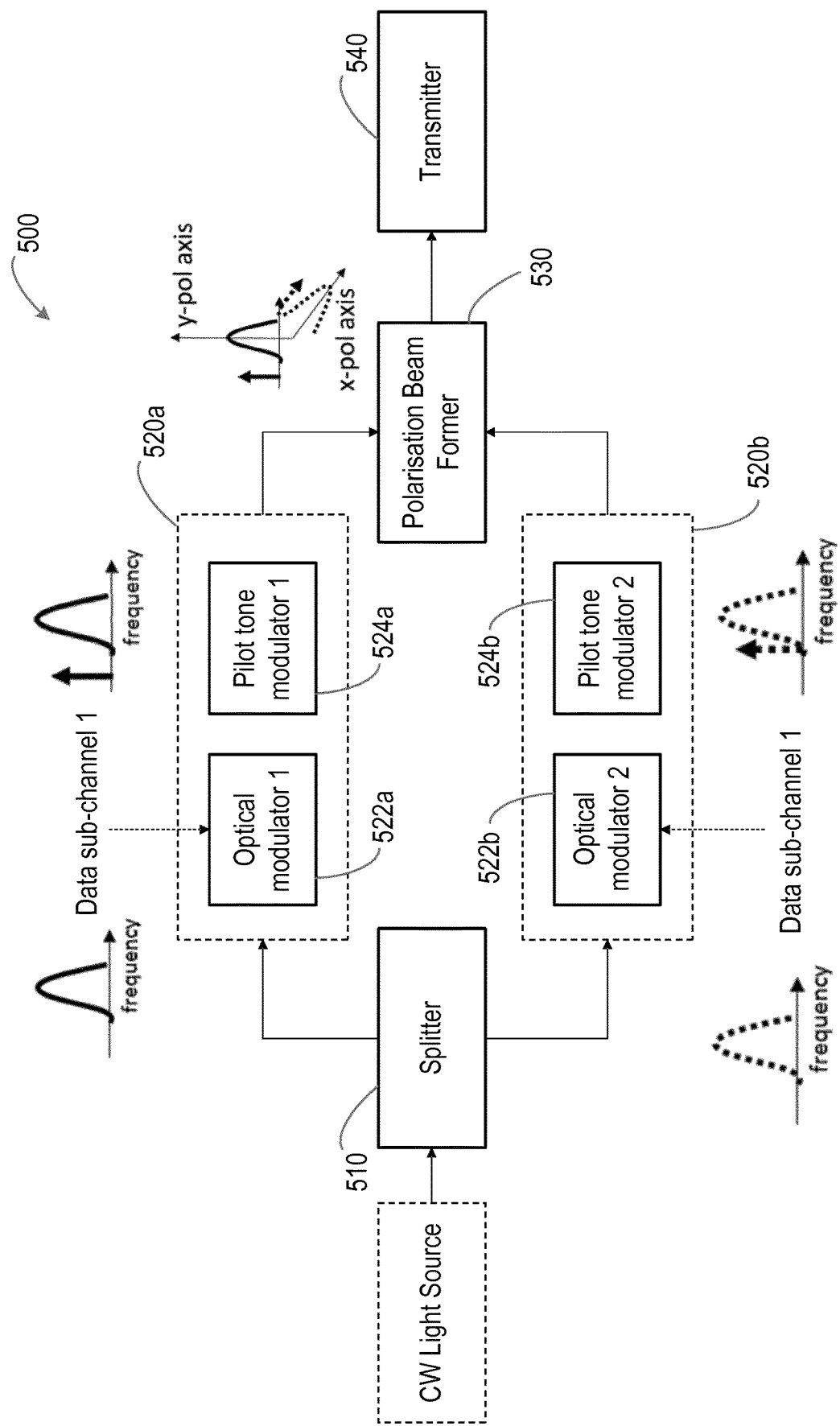
FIG. 5 is a block diagram illustrating elements in another example of an apparatus for dual polarisation optical transmission.

FIG. 5 illustrates another example of an apparatus 500 for dual polarisation optical transmission according to aspects of the present disclosure, which apparatus may perform the method 100 as discussed above. The elements illustrated in FIG. 5 may be logical elements or may be dedicated physical elements. The elements may be implemented in hardware and/or software and may be integrated to any degree. Referring to FIG. 5, the apparatus 500 comprises a splitter 510 configured to split a continuous wave light source into first and second sub-channels. The apparatus 500 also comprises first and second modulation elements 520*a* and 520*b*, configured to optically modulate each sub-channel with a data signal and to superimpose different first and second pilot tones onto the first and second optically modulated sub-channels. Each modulation element comprises a data sub-channel optical modulator 522*a*, 522*b*, configured to modulate the relevant sub-channel with an input data sub-channel. Each modulation element also comprises a pilot tone amplitude modulator 524*a*, 524*b*, configured to superimpose the first or second pilot tones onto the relevant optically modulated sub-channel. In other examples of the apparatus 500 (not shown), the separate pilot tone amplitude modulators may be omitted, and the pilot tones may be superimposed using low frequency modulation of the bias of the sub-channel modulators 522*a*, 522*b*, or by addition of the pilot tones to the electrical relevant data signal etc. In further examples, pilot tone modulation may be performed using existing elements, such as in place bias electrical lines. The apparatus 500 further comprises a polarisation combiner 530 configured to polarisation multiplex the first and second sub-channels to form a polarisation multiplexed signal, in which the first and second sub-channels have orthogonal states of polarisation, and a transmitter 540 configured to transmit the polarisation multiplexed signal.

Figure 6:
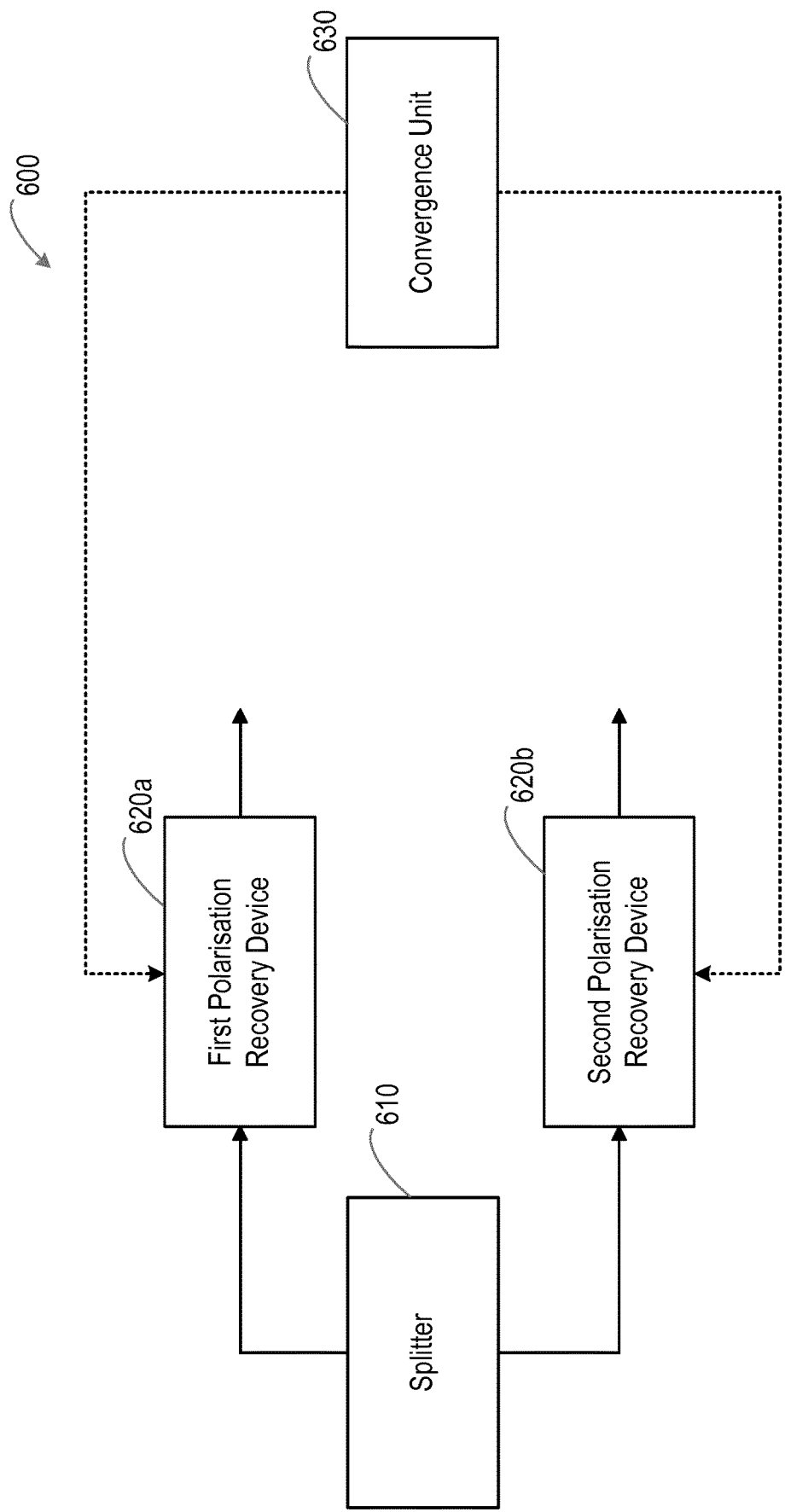
FIG. 6 is a block diagram illustrating elements in an apparatus for dual polarisation optical reception.

FIG. 6 illustrates a first example of an apparatus 600 for dual polarisation optical reception according to aspects of the present disclosure, which apparatus may perform the method 200 and/or 300 as discussed above. The elements illustrated in FIG. 6 may be logical elements or may be dedicated physical elements. The elements may be implemented in hardware and/or software and may be integrated to any degree. Referring to FIG. 6, the apparatus 600 comprises a splitter 610 configured to split a received polarisation multiplexed signal onto first and second optical paths, the received polarisation multiplexed signal comprising first and second sub-channels, the first sub-channel having superimposed a first pilot tone and the second sub-channel having superimposed a second pilot tone. The apparatus 600 further comprises a first polarisation recovery device 620a configured to receive a signal on the first optical path and a second polarisation recovery device 620b configured to receive a signal on the second optical path. The apparatus 600 further comprises a convergence unit 630 configured to use maximisation of power of one of the first or second pilot tones and minimisation of power of the other of the first or second pilot tones as a convergence condition for polarisation recovery of one the first and second sub-channels in the first and second polarisation recovery devices.

Figure 7:
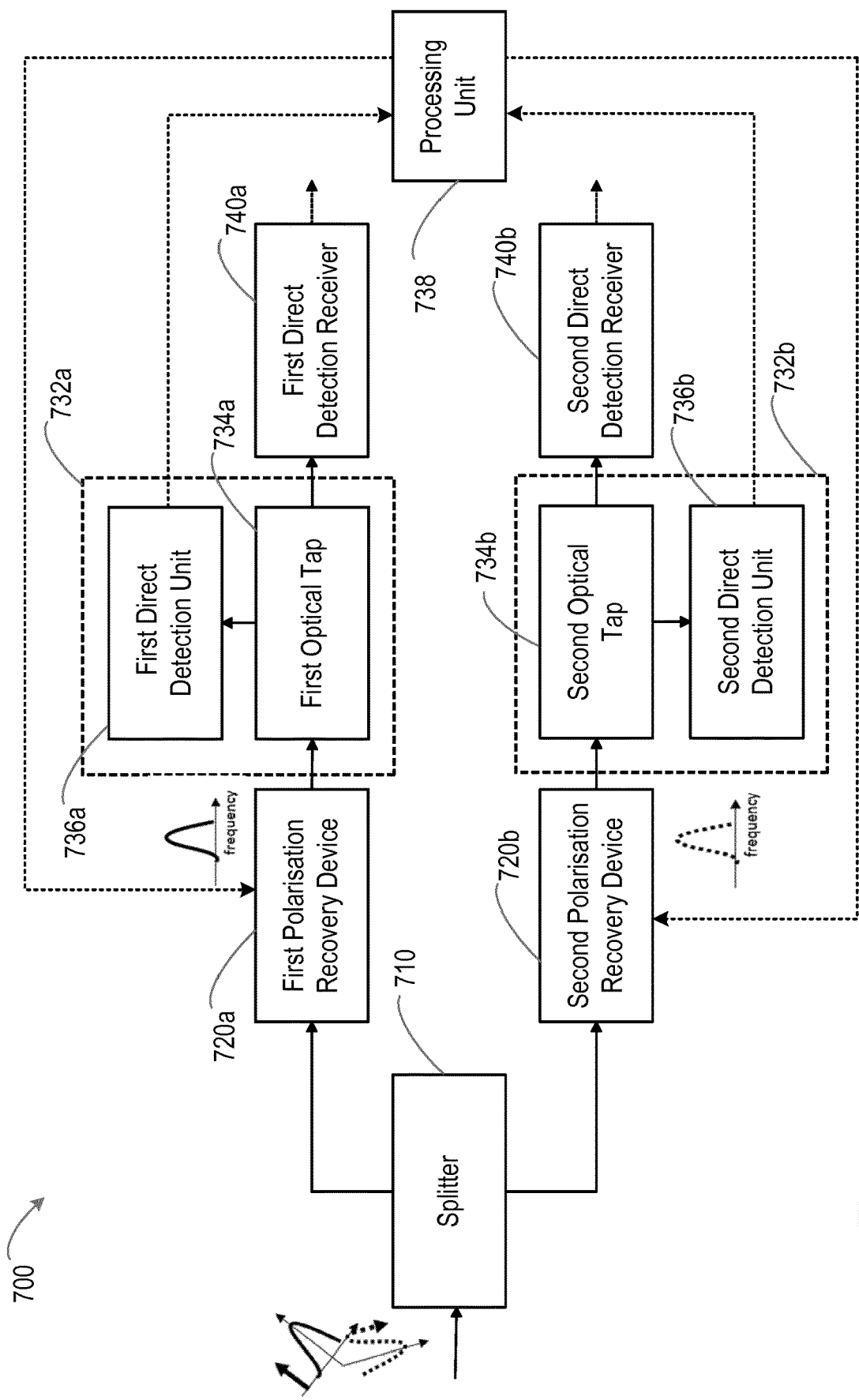
FIG. 7 is a block diagram illustrating elements in another example of an apparatus for dual polarisation optical reception.

FIG. 7 illustrates another example of an apparatus 700 for dual polarisation optical reception according to aspects of the present disclosure, which apparatus may perform the method 200 and/or the method 300 as discussed above. The elements illustrated in FIG. 7 may be logical elements or may be dedicated physical elements. The elements may be implemented in hardware and/or software and may be integrated to any degree. Referring to FIG. 7, the apparatus 700 comprises a splitter 710 configured to split a received polarisation multiplexed signal onto first and second optical paths, the received polarisation multiplexed signal comprising first and second sub-channels, the first sub-channel having superimposed a first pilot tone and the second sub-channel having superimposed a second pilot tone. The apparatus 700 further comprises a first polarisation recovery device 720a configured to receive a signal on the first optical path and a second polarisation recovery device 720b configured to receive a signal on the second optical path.

The apparatus 600 further comprises a convergence unit, e.g. functionally corresponding to convergence unit 630, configured to use maximisation of power of one of the first or second pilot tones and optionally minimisation of power of the other of the first or second pilot tones as a convergence condition for polarisation recovery of one the first and second sub-channels in the first and second polarisation recovery devices. The convergence unit comprises first and second extraction units 732a, 732b, each extraction unit configured to extract the first and second pilot tones from a signal output from a respective polarisation recovery device. Each of the first and second extraction units may comprise an optical tap 734a, 734b and a direct detection unit 736a, 736b configured to photodetect and filter a signal on a low power output of the respective optical tap 734a, 734b to retain only the first and second pilot tones.

The convergence unit also comprises a processing unit 738, which may for example be a Digital Signal Processor (DSP). Each of the first and second polarisation recovery devices 720a, 720b may have at least one control variable, and the processing unit 738 is configured to estimate a power of the first and second pilot tones extracted by the first and second extraction units 732a, 732b and to adjust a value of the control variable for each polarisation recovery device until a power of one of the first or second pilot tones on the signal output from the respective polarisation recovery device reaches a convergence threshold. The processing unit 738 may be configured to adjust a value of the control variable for each polarisation recovery device until a power of one of the first or second pilot tones on the signal output from the respective polarisation recovery device reaches a convergence threshold by, for a reference value of the control variable, adding an offset to the reference value of the control variable and estimating a resulting power of the first and second pilot tones obtained from the optical tap, removing the offset from the reference value of the control variable and estimating a resulting power of the first and second pilot tones obtained from the optical tap, and if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value, updating the reference value of the control variable by an adjustment value.

The apparatus 700 further comprises a first direct detection receiver 740a configured to receive a polarisation recovered signal from the first polarisation recovery device and a second direct detection receiver 740b configured to receive a polarisation recovered signal from the second polarisation recovery device. As illustrated in FIG. 7, the first and second direct detection receivers 740a, 740b may be arranged to receive a polarisation recovered signal from the high power outputs of the first and second optical taps 734a, 734b respectively.

Figure 8:
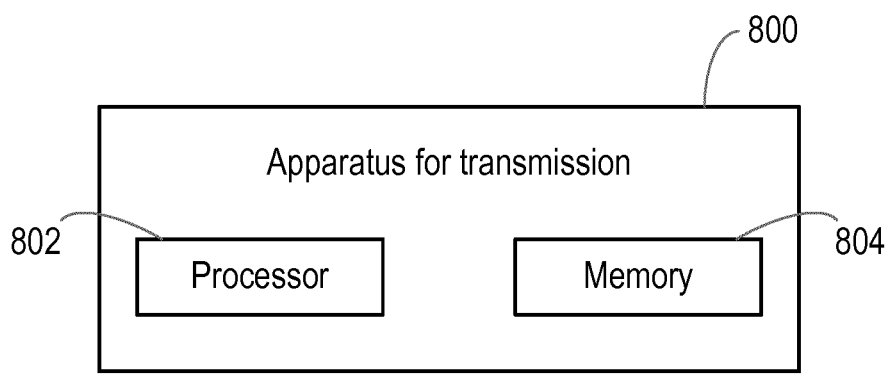
FIG. 8 is a block diagram illustrating elements in another example of an apparatus for dual polarisation optical transmission.

FIG. 8 illustrates another example of apparatus 800 for dual polarisation optical transmission which may implement the method 100 of FIG. 1, for example on receipt of suitable instructions from a computer program. Referring to FIG. 8, the apparatus 800 comprises a processor 802 and a memory 804. The memory 804 contains instructions executable by the processor 802 such that the apparatus 800 is operative to conduct some or all of the steps of the method 100.

Figure 9:
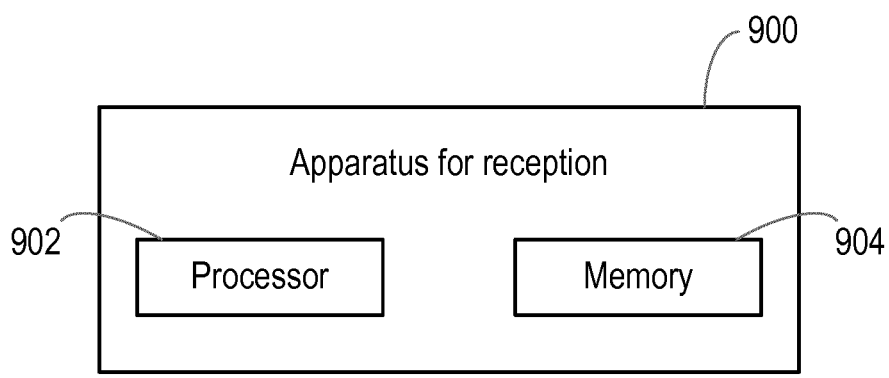
FIG. 9 is a block diagram illustrating elements in another example of an apparatus for dual polarisation optical reception.

FIG. 9 illustrates another example of apparatus 900 for dual polarisation optical reception which may implement the method 200 of FIG. 2 and/or the method 300 of FIG. 3, for example on receipt of suitable instructions from a computer program. Referring to FIG. 9, the apparatus 900 comprises a processor 902 and a memory 904. The memory 904 contains instructions executable by the processor 902 such that the apparatus 900 is operative to conduct some or all of the steps of the method 200 and/or the method 300.

Aspects of the present disclosure thus provide a dual polarisation optical communication system in which orthogonal polarisations are market by different pilot tones. A frequency of the pilot tones is selected such that the signal power spectral density is negligible at the pilot tone frequencies, so ensuring that the pilot tones can be easily extracted in a receiving apparatus. At reception of the dual polarised signal, relative power of the two pilot tones is used as a convergence criterion for polarisation recovery devices on two optical paths, onto which the received signal is split. Each polarisation recovery device may be able to transform an arbitrary input SOP into a fixed and known linearly polarized SOP. In silicon photonic devices, which are highly polarisation sensitive, this axis coincides with the axis of the main propagation mode.

At the output of each polarisation recovery device, the pilot tones are extracted and processed according to an iterative method in which control variables for each polarisation recovery device are independently established.

At a first step of an iterative method according to examples of the present disclosure, small positive and negative offsets are added to each control variable for a polarisation recovery device, keeping the other control variables constant, and corresponding pilot tone power variations are detected. At a second step of the example iterative method, it is established for which offset values the pilot tone powers vary in the right direction. On the first optical path, these are the values for which the power of a first pilot tone increases and that of a second pilot tone decreases. On the second optical path, these are the values for which the power of the first pilot tone decreases and that of the second pilot tone increases. Finally, the control variables are updated, for example using a variant of the stochastic gradient algorithm. Selected values from within a setting range for the relevant control variable may be assigned to control variables for which no good offset value is found. The first and second steps may be repeated until either a threshold value for pilot tone power is reached on one of the first or second paths, indicating that polarisation of the corresponding sub-channel has been recovered, or the method is unable to converge after a fixed maximum number of iterations. In such a case, selected values from within the setting ranges may be assigned to all control variables and the method may restart. Each polarisation recovery device may followed by a conventional direct detection receiver to receive the polarisation recovered signal.

Aspects of the present disclosure thus enable a doubling of the capacity of a high speed direct detection transmission system, with no modification of the signal framing protocol and no use of power consuming and expensive high speed DSP. Examples of the present disclosure may be implemented using cost effective silicon photonics technology and low speed electronics. Additionally, no assumptions concerning the structure, mathematical model or implementation details of polarisation recovery devices used according to example of the present disclosure need be made. It is sufficient to know simply the number and setting range of the control variables.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope. References to DWDM or CWDM may alternatively refer to any WDM optical signal.

The invention claimed is:

1. A method for dual polarisation optical reception, the method comprising:
    splitting a received polarisation multiplexed signal onto first and second optical paths, the received polarisation multiplexed signal comprising first and second sub-channels, the first sub-channel having superimposed a first pilot tone and the second sub-channel having superimposed a second pilot tone; and
    on each of the first and second paths:
        using maximisation of power of one of the first or second pilot tones for polarisation recovery of one of the first or second sub-channels.

2. The method as claimed in claim 1, further comprising using a minimisation of power of the other of the first or second pilot tones as a convergence condition for polarisation recovery of one of the first or second sub-channels.

3. The method as claimed in claim 2, wherein the pilot tone for which power is maximised on the first optical path is the pilot tone for which power is minimised on the second optical path.

4. The method as claimed in claim 2, wherein using maximisation of power of one of the first or second pilot tones and minimisation of power of the other of the first or second pilot tones as the convergence condition for polarisation recovery of one of the first or second sub-channels comprises:
    passing the received polarisation multiplexed signal on the path through a polarisation recovery device, the polarisation recovery device having at least one control variable;
    on output from the polarisation recovery device, extracting the first and second pilot tones;
    estimating a power of the pilot tones; and
    adjusting a value of the control variable of the polarisation recovery device until a power of one of the first or second pilot tones reaches a convergence threshold.

5. The method as claimed in claim 4, wherein extracting the first and second pilot tones comprises one of:
    tapping the signal output from the polarisation recovery device; and
    on a low power output of the optical tap, photodetecting and filtering the signal to retain only the first and second pilot tones;
    or
    photodetecting the signal output from the polarisation recovery device; and
    isolating the first and second pilot tones.

6. The method as claimed in claim 4, wherein extracting the first and second pilot tones comprises tapping the signal output from the polarisation recovery device; and, on a low power output of the optical tap, photodetecting and filtering the signal to retain only the first and second pilot tones;
    and wherein using direct detection to receive the polarisation recovered sub-channel comprises:
        when the power of one of the first or second pilot tones reaches the convergence threshold,
        performing direct detection on a signal output from a high power output of the optical tap.

7. The method as claimed in claim 4, wherein adjusting the value of the control variable of the polarisation recovery device until the power of one of the first or second pilot tones reaches a convergence threshold comprises:
    for a reference value of the control variable:
        adding an offset to the reference value of the control variable and estimating a resulting power of the extracted first and second pilot tones;

removing the offset from the reference value of the control variable and estimating a resulting power of the extracted first and second pilot tones; and if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value:
updating the reference value of the control variable by an adjustment value.

8. The method as claimed in claim 7, wherein adjusting the value of the control variable of the polarisation recovery device until the power of one of the first or second pilot tones reaches the convergence threshold further comprises:

if, after addition or removal of the offset to the reference value of the control variable, an estimated power of one of the first or second pilot tones is not greater than when the control variable is at the reference value, or a power of the other of the first or second pilot tones is not less than or equal to when the control variable is at the reference value then:
updating the reference value of the control variable to be a selected value within a setting range for the control variable.

9. The method as claimed in claim 7, wherein adjusting the value of the control variable of the polarisation recovery device until the power of one of the first or second pilot tones reaches the convergence threshold further comprises:
repeating the steps of adding, removing and updating until an estimated power of one of the first or second pilot tones reaches the convergence threshold.

10. The method as claimed in claim 4, wherein the polarisation recovery device has a plurality of control variables, and wherein using maximisation of power of one of the first or second pilot tones and minimisation of power of the other of the first or second pilot tones as the convergence condition for polarisation recovery of one of the first or second sub-channels further comprises:
adjusting a value of each of the plurality of control variables of the polarisation recovery device until the power of one of the first or second pilot tones reaches the convergence threshold.

11. The method as claimed in claim 4, further comprising:
if the power of one of the first or second pilot tones does not reach the convergence threshold within a target number of adjustments, updating the reference value of the control variable to be a selected value within a setting range for the control variable.

12. The method as claimed in claim 4, wherein if, after adjustment of the value of the control variable, the power of both pilot tones increases or decreases, the method further comprises concluding that an orthogonality of the first and second sub-channels has been lost.

13. The method as claimed in claim 4, wherein if, after multiple adjustments of the value of the control variable, the power of the first and second pilot tones remains substantially unchanged, the method further comprises concluding that an orthogonality of the first and second sub-channels has been lost.

14. The method as claimed in claim 1, further comprising, on each of the first and second paths:
using direct detection to receive the polarisation recovered sub-channel.

15. An apparatus for dual polarisation optical reception, the apparatus comprising:

a splitter configured to split a received polarisation multiplexed signal onto first and second optical paths, the received polarisation multiplexed signal comprising first and second sub-channels, the first sub-channel having superimposed a first pilot tone and the second sub-channel having superimposed a second pilot tone;
a first polarisation recovery device configured to receive a signal on the first optical path and a second polarisation recovery device configured to receive a signal on the second optical path; and
a convergence unit configured to use maximisation of power of one of the first or second pilot tones for polarisation recovery of one the first and second sub-channels in the first and second polarisation recovery devices.

16. The apparatus as claimed in claim 15, further comprising:
a first direct detection receiver configured to receive a polarisation recovered signal from the first polarisation recovery device and a second direct detection receiver configured to receive a polarisation recovered signal from the second polarisation recovery device.

17. The apparatus as claimed in claim 15, wherein each of the first and second polarisation recovery devices has at least one control variable, and wherein the convergence unit comprises:
first and second extraction units, each extraction unit configured to extract the first and second pilot tones from a signal output from a respective polarisation recovery device; and
a processing unit configured to estimate a power of the first and second pilot tones on the signals output from each of the polarisation recovery devices and to adjust a value of the control variable for each polarisation recovery device until a power of one of the first or second pilot tones on the signal output from the respective polarisation recovery device reaches a convergence threshold.

18. The apparatus as claimed in claim 17, wherein each of the first and second extraction units comprises:
an optical tap; and
a direct detection unit configured to photodetect and filter a signal on a low power output of the optical tap to retain only the first and second pilot tones.

19. The apparatus as claimed in claim 17, wherein the processing unit is configured to adjust the value of the control variable for each polarisation recovery device until the power of one of the first or second pilot tones on the signal output from the respective polarisation recovery device reaches the convergence threshold by:
for a reference value of the control variable:
adding an offset to the reference value of the control variable and estimating a resulting power of the first and second pilot tones obtained from the optical tap;
removing the offset from the reference value of the control variable and estimating a resulting power of the first and second pilot tones obtained from the optical tap; and
if, after addition or removal of the offset to the reference value of the control variable, an estimated power of one of the first or second pilot tones is greater than when the control variable is at the reference value, and a power of the other of the first or second pilot tones is less than or equal to when the control variable is at the reference value,
updating the reference value of the control variable by an adjustment value.

20. An apparatus for dual polarisation optical reception, the apparatus adapted to:
- split a received polarisation multiplexed signal onto first and second optical paths, the received polarisation multiplexed signal comprising first and second sub-channels, the first sub-channel having superimposed a first pilot tone and the second sub-channel having superimposed a second pilot tone; and
- on each of the first and second paths:
  - use maximisation of power of one of the first or second pilot for polarisation recovery of one of the first or second sub-channels.

21. The apparatus as claimed in claim 20, wherein the apparatus is further adapted to, on each of the first and second paths:
- use direct detection to receive the polarisation recovered sub-channel.

22. An apparatus for dual polarisation optical reception, the apparatus comprising a processor and a memory, the memory containing instructions executable by the processor such that the apparatus is operative to:
- split a received polarisation multiplexed signal onto first and second optical paths, the received polarisation multiplexed signal comprising first and second sub-channels, the first sub-channel having superimposed a first pilot tone and the second sub-channel having superimposed a second pilot tone; and
- on each of the first and second paths:
  - use maximisation of power of one of the first or second pilot tones for polarisation recovery of one of the first or second sub-channels.

23. The apparatus as claimed in claim 22, wherein the apparatus is further operative to, on each of the first and second paths:
- use direct detection to receive the polarisation recovered sub-channel.

24. A system for dual polarisation optical communication, the system comprising:
- an apparatus for dual polarisation optical transmission including:
  - a splitter configured to split a continuous wave light source into first and second sub-channels;
  - first and second modulation elements configured to optically modulate each sub-channel with a data signal and to superimpose different first and second pilot tones onto the first and second optically modulated sub-channels;
  - a polarisation combiner configured to polarisation multiplex the first and second sub-channels to form a polarisation multiplexed signal, in which the first and second sub-channels have orthogonal states of polarisation; and
  - a transmitter configured to transmit the polarisation multiplexed signal; and
- an apparatus for dual polarisation optical reception including:
  - a splitter configured to split a received polarisation multiplexed signal onto first and second optical paths, the received polarisation multiplexed signal comprising first and second sub-channels, the first sub-channel having superimposed a first pilot tone and the second sub-channel having superimposed a second pilot tone;
  - a first polarisation recovery device configured to receive a signal on the first optical path and a second polarisation recovery device configured to receive a signal on the second optical path; and
  - a convergence unit configured to use maximisation of power of one of the first or second pilot tones for polarisation recovery of one the first and second sub-channels in the first and second polarisation recovery devices.

25. The system as claimed in claim 24, wherein a frequency of each of the first and second pilot tones is selected from a frequency range at which power spectral density of the corresponding optically modulated sub-channel is negligible.

26. The system as claimed in claim 24, wherein each of the first and second modulation elements comprises:
- a data sub-channel optical modulator; and
- a pilot tone amplitude modulator.

* * * * *